Nov. 29, 1955  J. CATRY ET AL  2,725,080
CIRCULAR LOOMS

Filed June 20, 1952  6 Sheets-Sheet 1

Inventors
Jean Catry
Robert Morrie Low
By
Attorneys.

Nov. 29, 1955   J. CATRY ET AL   2,725,080
CIRCULAR LOOMS
Filed June 20, 1952   6 Sheets-Sheet 2
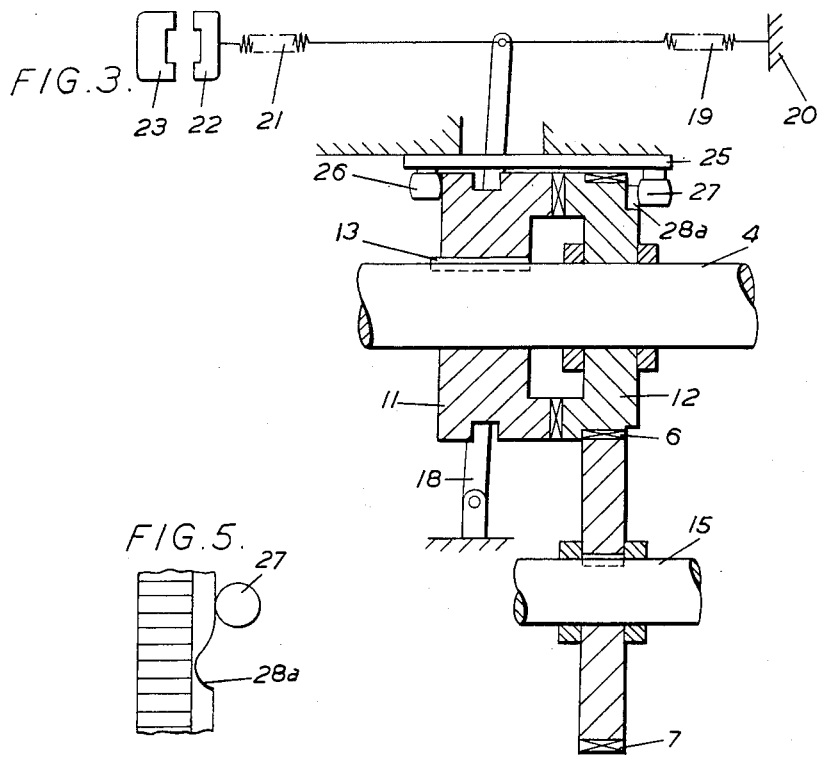
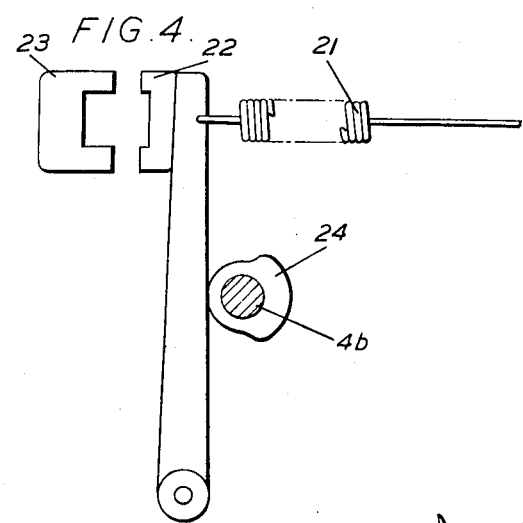
Inventors
Jean Catry
Robert Hardie Low
By
Attorneys Nov. 29, 1955    J. CATRY ET AL    2,725,080
CIRCULAR LOOMS
Filed June 20, 1952    6 Sheets-Sheet 3
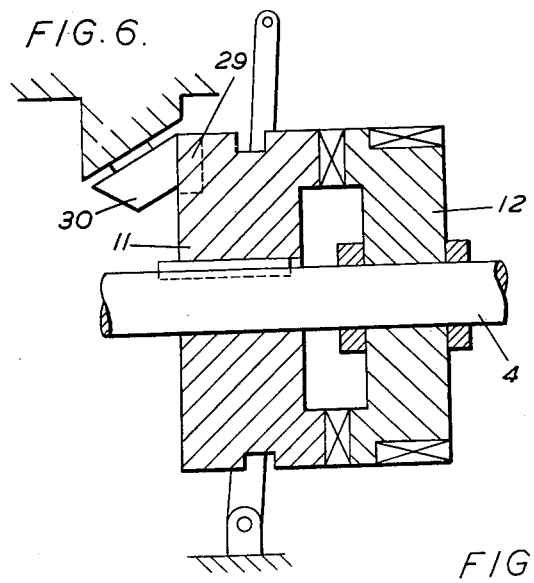
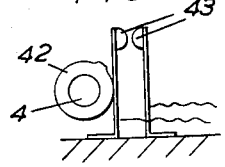
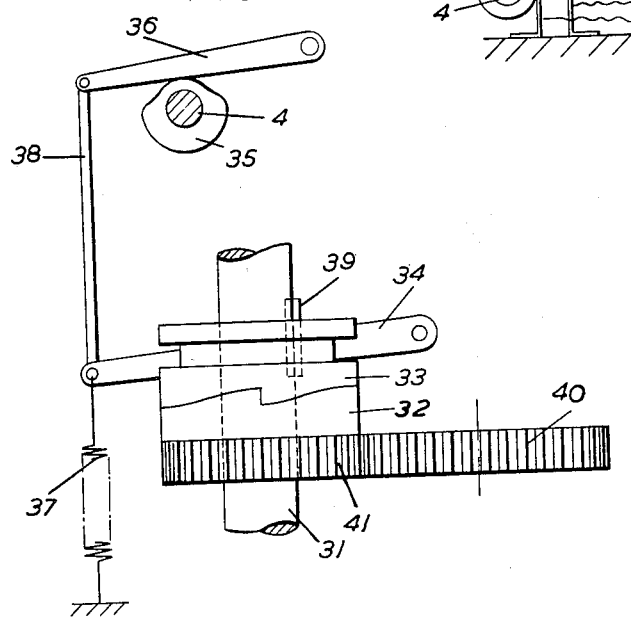
Inventors
Jean Catry
Robert Hardie Low
By Norris a Bateman
Attorneys.

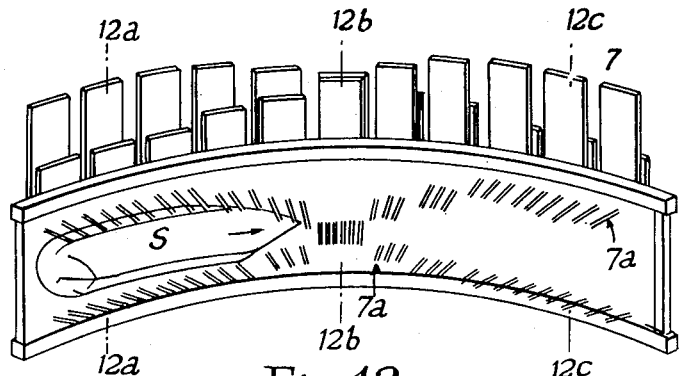
Fig. 12.
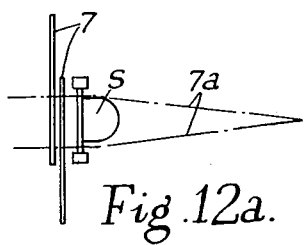
Fig. 12a.
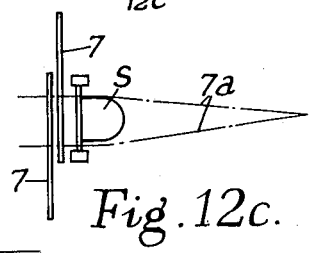
Fig. 12c.
Fig. 12b.
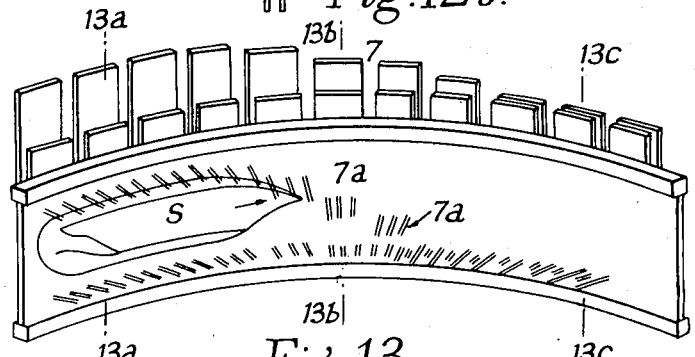
Fig. 13.
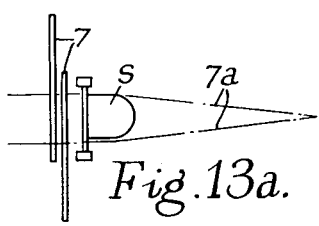
Fig. 13a.
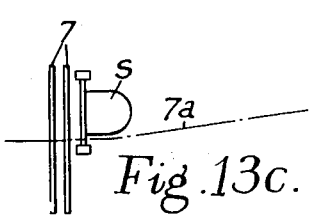
Fig. 13c.
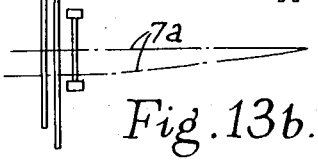
Fig. 13b.

United States Patent Office 2,725,080
Patented Nov. 29, 1955

2,725,080

CIRCULAR LOOMS

Jean Catry, Flixecourt, France, and Robert Norrie Low, Dundee, Scotland, assignors to Fairwest (U. K.) Limited, London, England, a British company Application June 20, 1952, Serial No. 294,531

Claims priority, application Great Britain June 29, 1951

9 Claims. (Cl. 139—13)

This invention relates to circular looms of the kind disclosed for example in United States Patent No. 2, 248,281, granted July 8, 1941, in which the movements of the healds are effected directly or indirectly by the action of rotary cams, and has for its object to provide improved means whereby; when, for instance, it is desired to effect repair of broken weft threads, the shuttles may be uncovered by moving the healds into one of their extreme positions, and in turn may be re-covered by allowing the healds to move out of said extreme position, this sequence of heald movements being carried out with a view to avoiding faults in the woven pattern.

According o the invention, each rotary cam, or group of cams, is associated with a second or auxiliary cam capable of being rotated at a speed in predetermined relationship to that of the shuttles and of disengaging the part actuating the heald or group of healds from its main cam and causing it to draw its associated heald or group of healds into one extreme position, and after a predetermined angular movement of the shuttles allowing the part actuating the healds to return to its original position.

Preferably, the contour of the auxiliary cam and its speed of rotation are such that the shuttles remain uncovered for a predetermined angle of their movement about the axis of the loom and means are provided, whereby, when once the auxiliary cam has been set in motion, the resulting series of heald movements to bring them into their original positions is obliged to be completed. Should the loom stop, the aforesaid series of heald movements would then be completed after the loom has been restarted.

The invention will be described by way of example, with reference to the accompanying drawings of which—

Fig. 3 is a fragmentary sectional view, partly diagrammatic, illustrating means for driving an auxiliary cam shaft.

Fig. 4 is a fragmentary view corresponding to Fig. 3 showing a means for re-setting a magnet controlling the drive of the auxiliary cam shaft.

Fig. 5 is a part plan view corresponding to Fig. 3.

Fig. 6 is a view similar to Fig. 3 showing an alternative arrangement of controlling drive of the auxiliary cam shaft.

Fig. 7 is a diagrammatic view of mechanism for stopping the uptake drive.

Fig. 8 is a diagrammatic view of an electrical detail.

Fig. 12 is a diagrammatic elevation of part of a circular loom illustrating the method of shedding.

Figs. 12a, 12b and 12c are vertical sections on the lines 12a—12a, 12b—12b and 12c—12c respectively in Fig. 12, showing diagrammatically a sequence of operation of the healds to form a shed.

Fig. 13 is a view similar to Fig. 12 illustrating diagrammatically the method of exposing a shuttle.

Figs. 13a, 13b and 13c are vertical sections on the lines 13a—13a, 13b—13b and 13c—13c respectively in Fig. 13, illustrating diagrammatically a sequence of operation of the healds to cause a shuttle to be exposed.

Figure 1:
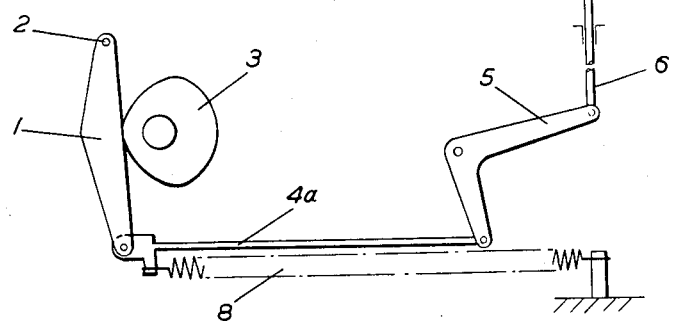
Fig. 1 is a diagrammatic sectional view taken on a radial plane of a loom and illustrating an existing arrangement of mechanism for operating each heald.

As shown in Fig. 1, a main cam 3 actuates a rocking lever 1, fulcrumed at 2, and maintained in contact with main cam 3 by a tension spring 8. The movement of rocking lever 1 is transmitted to a heald 7 through connecting rods 4a and 6 and bell crank lever 5.

Figure 2:
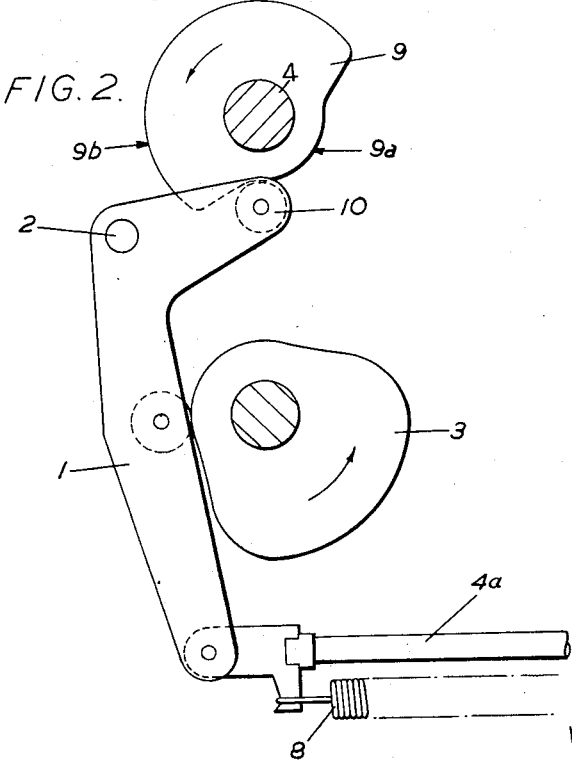
Fig. 2 is a fragmentary view similar to Fig. 1, but illustrating the mechanism of Fig. 1 adapted to conform with the invention.

In Fig. 2, the rocking lever 1 fulcrumed at 2 is now formed with a lateral extension carrying a bowl 10 which engages an auxiliary cam 9, mounted on a shaft 4. The surface 9a of auxiliary cam 9 is at such a distance from the shaft 4 that it will clear the bowl 10, thus preventing interference with normal operation of rocking lever 1, when that lever is actuated by main cam 3. The surface 9b of the auxiliary cam 9 is at such a distance from the shaft 4 that it can move the rocking lever 1 to a position corresponding to the lowest position of its associated heald 7.

When it is required to lower all the healds 7, and therefore the warp threads 7a, from their normal weaving positions as shown in Figs. 12, 12a, 12b and 12c, thus exposing the shuttles S as shown in Figs. 13, 13a, 13b and 13c, the auxiliary cams 9 start rotating when main cams 3 reach predetermined positions, the speed of rotation of auxiliary cams 9 being then in a predetermined relationship with that of main cams 3.

When rotating, the auxiliary cams 9, acting on the bowl 10, first move the rocking levers 1 to a point corresponding to the lowest position of their associated healds, then retain rocking levers 1 at that point during a predetermined angle of rotation, and then allow the rocking levers 1 to move back into contact with the main cams 3.

As shown in Fig. 3, the shaft 4 is that of the auxiliary cams 9 and is driven through a dog or like positive clutch consisting of two similar and opposed crown wheels 11 and 12, one of which, 11, is mounted on the shaft 4, so as to be longitudinally slidable thereon but rotatable therewith through the medium of a shaft key 13, whilst the other crown wheel 12, is rotatable on said shaft and is connected to a driving shaft 15 by means of spur gear wheel 7.

The slidable element 11 of the clutch is adapted to be operated by a clutch fork 18 in the usual manner of operating clutches but is controlled by two opposed springs of unequal strength, the weaker of said springs 19 having a fixed anchorage 20 whilst the remote end of the stronger spring 21 is attached to the armature 22 of an electro-magnet 23.

The arrangement is such that when the electro-magnet 23 is de-energised, the weaker spring 19 causes engagement of the clutch elements 11 and 12 and when the contact faces of the electro-magnet 23 and its armature 22 are brought together the stronger spring 21 tends to cause disengagement of the clutch elements 1 and 2.

As shown in Fig. 4, the armature 22 of the electro-magnet is capable of being brought into contact with the electro-magnet 23 by means of a cam 24 mounted on a shaft 4b which is in a train of auxiliary cam shafts, which train includes shaft 4.

To ensure that the auxiliary cam shaft 4 may be brought into action only when the main cams 3 reach predetermined positions, the number of teeth on the clutch elements 11 and 12 is determined accordingly. It is also necessary that the auxiliary cam shaft 4 should not then be capable of disengagement until the main cams 3 have reached predetermined positions.

To enable this desideratum to be effected, the clutch is furnished, as shown in Fig. 3, with a sliding cross piece 25 carrying at one end a roller 26 and at the other end a roller 27, each of which bears on the contiguous outer face of the adjacent clutch element whereby the two elements 11 and 12 are normally prevented from disengagement. At one point, as shown in Fig. 3 and enlarged plan view Fig. 5, around its outer end face the element 12 of the clutch is formed with a depression 28a capable of receiving the corresponding roller 27 and of a depth sufficient to enable the clutch elements 11 and 12 to disengage. Consequently it is only when the driven shaft 4 reaches the position determined by the roller 27 and the depression 28a that the clutch can be disengaged, the driven shaft 4 can stop and normal weaving be allowed to proceed.

Fig. 6 illustrates an alternative method of controlling disengagement of the clutch. In this arrangement the slidable element 11 of the clutch is formed with a depression 29 on its outer face. A freely rotatable tapered roller 30 bears on the contiguous outer-face of the adjacent clutch element 11 whereby the two clutch elements 11 and 12 are normally prevented from disengagement and are capable of disengagement only when the tapered roller 30 enters the depression 29.

When the auxiliary cam shaft 4 is rotating the shuttles are out of the shed for a certain period of time and consequently no weaving takes place. To prevent any fault in the spacing of the weft it is therefore necessary to stop the take-up drive during the aforesaid period of time.

Fig. 7 illustrates how this control is effected. On the take-up driving shaft 31 is mounted two elements 32, 33 of a positive or dog type clutch, one of which elements 32, is rotatable on said shaft 31 and is driven by means of two gears 40 and 41. The element 33 is mounted so as to be longitudinally slidable on but rotatable with said shaft 31 through the medium of a key 39. The slidable element 33 is adapted to be operated by a clutch fork 34 in the usual manner of operating clutches but is controlled by rotary cam 35 mounted on auxiliary cam shaft 4, and through the medium of a lever 36, rod 38 and anchored retaining spring 37.

When the auxiliary cam shaft 4 commences to rotate, the rotary cam 35 disengages the clutch elements 32 and 33 thus stopping the take-up driving shaft 31. The profile of rotary cam 35 is such that after a predetermined angle of rotation the cam allows said elements 32 and 33 to re-engage, thus restarting the uptake drive.

When the shuttles are being uncovered it may be necessary to stop the loom, for example to repair a weft break. It is then essential that the loom should stop with the shuttles in a fully exposed position and Fig. 8 illustrates how this can be achieved. A rotary cam 42 is mounted on the auxiliary cam shaft 4 in such a way as to be capable of actuating an electric switch 43.

When the auxiliary cam shaft 4 starts rotating for the purpose of uncovering the shuttles, it brings cam 42 to such a position that the switch 43 is closed, thereby opening or closing an electric circuit controlling the stoppage of the loom.

When a fault has occurred in the cloth it is sometimes necessary to cut out the weft threads woven after the fault and then allow the cloth to come back to the point where faultless weaving can re-commence.

The releasing of the cloth is realised as follows: The shuttles are uncovered as previously explained, the loom then stopping with the shuttles exposed, and the take-up driving shaft disconnected.

Figure 9:
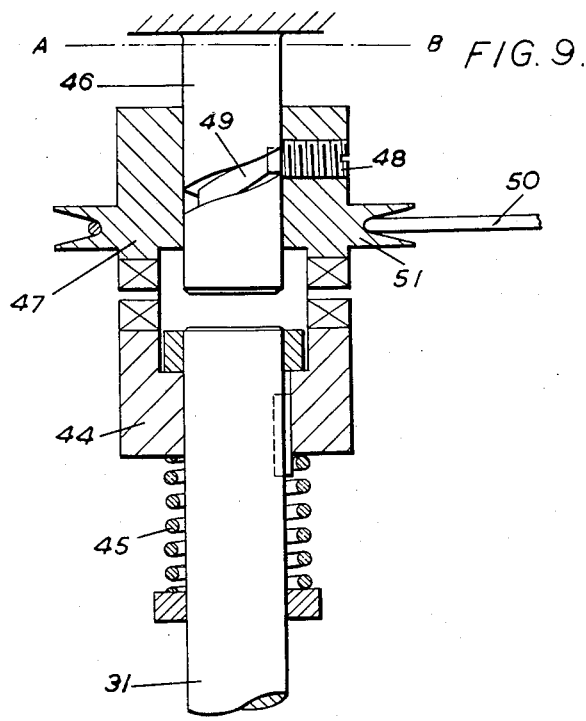
Figs. 9 and 10 are respectively fragmentary sectional elevation and plan of a reversing drive for the uptake driving shaft, Fig. 10 being taken on line A—B of Fig. 9.
Figure 10:
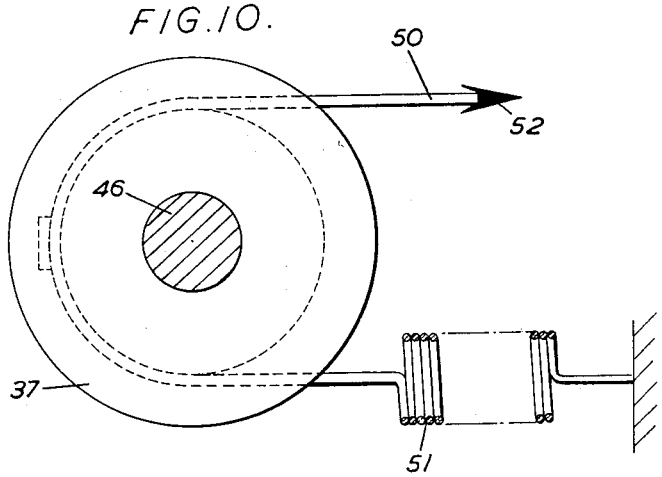
Figure 11:
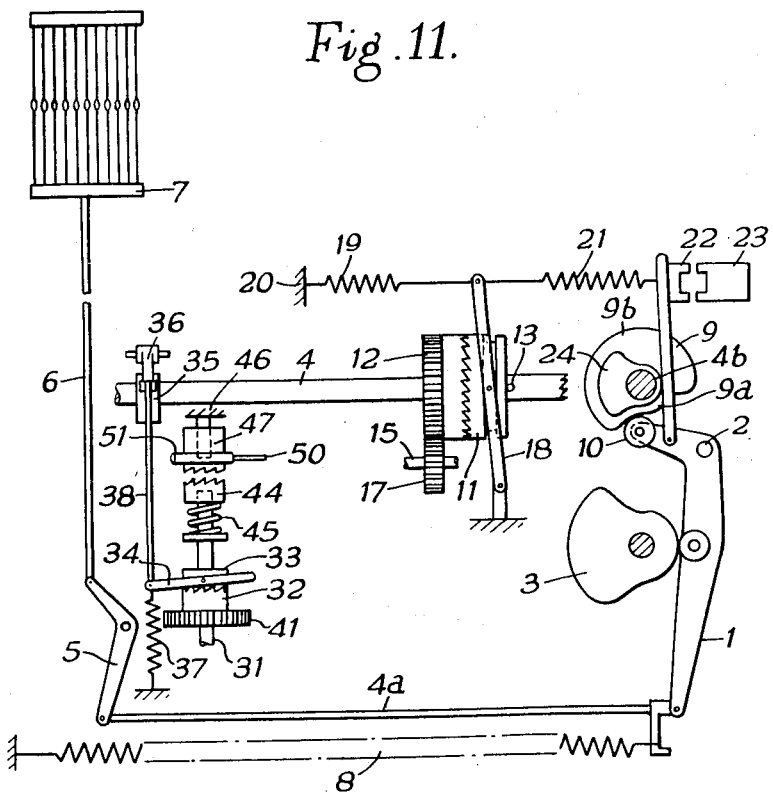
Fig. 11 is a vertical section, partly in elevation, showing the interconnections of the parts shown in the preceding figures.

Figs. 9 and 10 illustrate how rotation of the take-up driving shaft can be reversed. The take-up driving shaft 31 has slidably mounted on its end a saw-tooth clutch element 44 supported by a compression spring 45. A stub axle 46 on a common axis with shaft 31 supports a second saw-tooth clutch element 47, which is located by a stud 48 projecting internally from said element and engaging in a helical groove 49 formed on the stub axle 46. The clutch element 47 is formed with a pulley 51 capable of being rotated by means of a cable 50. As shown in Fig. 10, an anchored spring 52 exerts tension on the cable 50 and tends to retain the clutch element 47 in the disengaged position.

When cable 50 is pulled (e. g. manually) in the direction of arrow 52 the clutch element 47 is rotated and is forced downwards by the action of stud 48 in the helical groove 49. The clutch elements 44 and 47 then engage and the take-up driving shaft 31 is rotated by a small amount. This sequence of operations can be repeated as often as desired in order to take up the required length of cloth.

In the normal operation of a circular loom of the type to which the present invention is applied, the auxiliary shaft 4 is at rest, the electro-magnet 23 being energized and the spring 21 holding the clutch member 11 disengaged from the clutch member 12, and each main cam 3 is then operative to actuate its respective heald, the main cams operating the healds 7 sequentially so that the healds of a group are alternately raised or lowered, thereby forming a shed of warp threads 7a in advance of the shuttle through which the shuttle travels in its circular race, as illustrated diagrammatically in Fig. 12a, following which pairs of healds are reversed in their positions and assume the positions illustrated diagrammatically in Fig. 12c.

When the auxiliary shaft 4 is set into operation by de-energizing of the electro-magnet 23 and consequent engagement of the clutch member 11 with the clutch member 12 under the action of the spring 19, as shown in Fig. 3, rotation of each auxiliary cam 9 on this shaft retracts the lever 1 from its operative relation with its respective main cam 3, and the healds of a group which were in raised position, as shown diagrammatically in Fig. 13a, are lowered to the position illustrated in Fig. 13c, all of the warp threads being then lowered so that the shuttle and weft threads are exposed above the warp threads. As the shaft 4 completes a revolution, it is stopped automatically by disengagement of the clutch members 11, 12 through the action of the cam 24 on the shaft 4 and the spring 21 (Fig. 4), the auxiliary cam 9 when being in the position shown in Fig. 2 so that the lever 1 is allowed to return to cooperative relation with the respective main cam 3. During the rotation of the shaft 4, the cam 35 thereon (Fig. 7) disengages the clutch 32, 33, thereby interrupting the drive of the take-up operating shaft 31.

We claim:

1. A circular loom of the type having a plurality of healds, arranged in a closed figure, rotary main cams and cooperating parts for actuating the healds to form a shed of warp threads, and shuttles which pass through the shed, comprising an auxiliary cam which is associated with each main cam and is normally inoperative but which is capable of being rotated, when necessary, at a speed in predetermined relationship to that of the shuttles and of disengaging the part actuating the heald or group of healds from its main cam and causing it to draw its associated heald or group of healds into one extreme position and after a predetermined angular movement of the shuttles allowing the part actuating the healds to return to its original position, and means for ensuring commencement of the rotation of the auxiliary cam at a point in predetermined relationship with the position of the shuttles.

2. A circular loom as claimed in claim 1, in which the contour of the auxiliary cam and its speed of rotation are such that the shuttles remain uncovered for a predetermined angle of their movement about the axis of the loom and means are provided whereby, when once the auxiliary cam has been set in motion, the resulting sequence of heald movements must necessarily be completed in spite of any intermediate stopping and starting of the loom as a whole.

3. A circular loom as claimed in claim 1, wherein the auxiliary cam is driven through the medium of a clutch which can be engaged and disengaged only when the shuttles are at predetermined positions.

4. A circular loom as claimed in claim 3, wherein the two elements of the clutch are normally held in engagement by means of two rollers, carried by a slide-bar and engaging one with each outer face of the two elements, a recess in the outer face of the driven element and capable of being entered by the adjacent roller enabling said elements to be disengaged only when in a predetermined angular position.

5. A circular loom as claimed in claim 3, wherein the two elements of the clutch are normally held in engagement by means of a tapered roller carried by a fixed support and contacting with the outer face of one of said elements, a recess in said outer face capable of being entered by said roller enabling said elements to be disengaged only when in a predetermined angular position.

6. A circular loom as claimed in claim 1, wherein the actuation of the auxiliary cam shaft is controlled through the medium of an electro-magnet capable of being re-set by means actuated by said auxiliary cam shaft itself.

7. A circular loom as claimed in claim 1, having an uptake (take-up) driving shaft controlled from the auxiliary cam shaft.

8. A circular loom as claimed in claim 7, wherein the uptake driving shaft is provided with means whereby it may be reversed so as to effect the controlled release of the cloth.

9. A circular loom as claimed in claim 1, wherein the auxiliary cam shaft is provided with means for stopping the loom.

References Cited in the file of this patent

UNITED STATES PATENTS

| | | |
|---|---|---|
| 1,538,624 | Cunniff | May 19, 1925 |
| 2,592,820 | Moessinger | Apr. 15, 1952 |

FOREIGN PATENTS

| | | |
|---|---|---|
| 474,669 | Great Britain | Nov. 1, 1937 |